United States Patent [19]

Bell et al.

[11] 4,197,611
[45] Apr. 15, 1980

[54] HAND GRIP FOR COOKING UTENSIL HANDLE

[75] Inventors: Gordon D. Bell; Ronald E. Bratton, both of Fort Wayne; Robert J. Kennedy, Jr.; Kendall S. Smith, II, both of West Lafayette, all of Ind.; Roger A. Kaye, Palo Alto, Calif.

[73] Assignee: Lincoln Manufacturing Company, Inc., Fort Wayne, Ind.

[21] Appl. No.: 942,443

[22] Filed: Sep. 14, 1978

[51] Int. Cl.² ............................................. A47J 45/08
[52] U.S. Cl. ........................... 16/116 R; 16/DIG. 12; 74/558.5
[58] Field of Search ........ 16/110 A, 116 R, DIG. 12; 74/551.9, 558.5

[56] References Cited

U.S. PATENT DOCUMENTS

| 1,712,675 | 5/1929  | Olsen       | 16/116 R |
| 1,730,820 | 10/1929 | Holden      | 16/116 R |
| 2,133,252 | 10/1938 | Moore et al.| 16/116 R |
| 2,140,157 | 12/1938 | Huffman     | 16/116 R |
| 2,144,474 | 1/1939  | Woodman     | 16/116 R |
| 2,254,571 | 9/1941  | Hailey      | 16/116 R |
| 2,520,808 | 8/1950  | Miller      | 16/116 R |

FOREIGN PATENT DOCUMENTS 532015  1/1941  United Kingdom .................. 16/116 R

*Primary Examiner*—Andrew V. Kundrat
*Attorney, Agent, or Firm*—Albert L. Jeffers

[57] ABSTRACT

A hand grip adapted to be slipped over the metal handles of cooking utensils such as pots and fry pans, having particular application to commercial grade utensils wherein the handles are metal and customarily not provided with a thermally insulating gripping portion. The hand grip is elongated and made of a resilient silicone rubber material having low thermal conductivity so as to remain cool to the touch even though the metal handle becomes quite hot. Extending nearly completely through the grip is a longitudinal opening having a plurality of axial ribs within the opening, which define axial passageways for the flow of air between the metal handle and grip thereby enhancing the insulating qualities of the grip in some circumstances. If desired, the opening may be flat and unobstructed. The grip has suitable durometer and frictional characteristics to remain in place on the metal handle during use.

11 Claims, 7 Drawing Figures

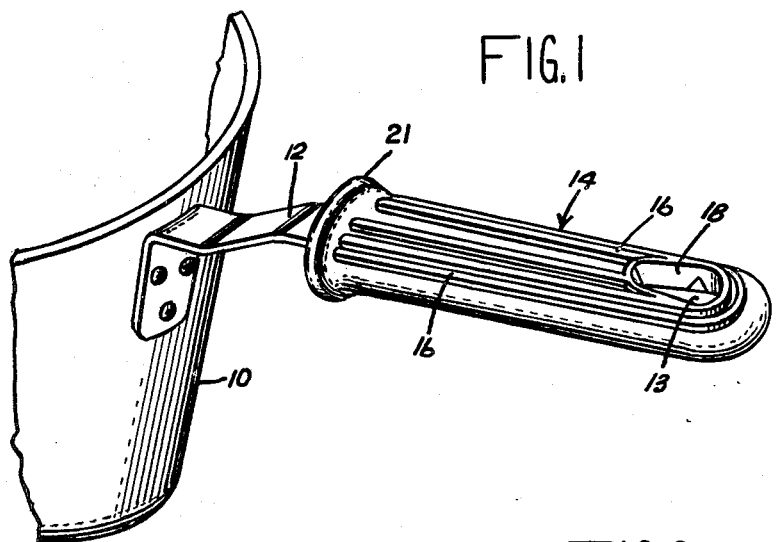
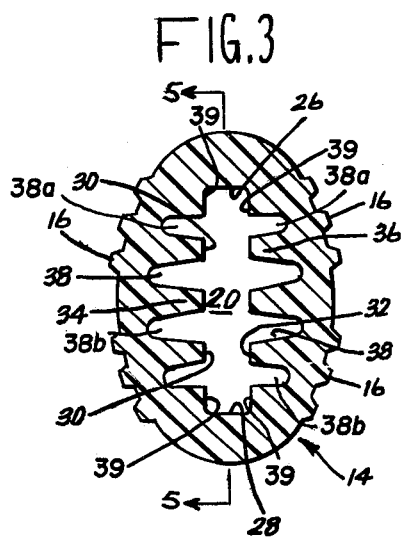
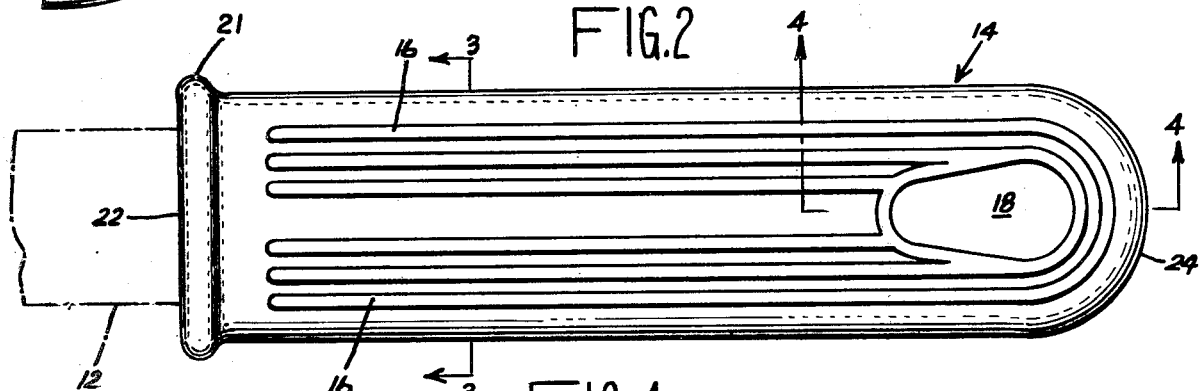
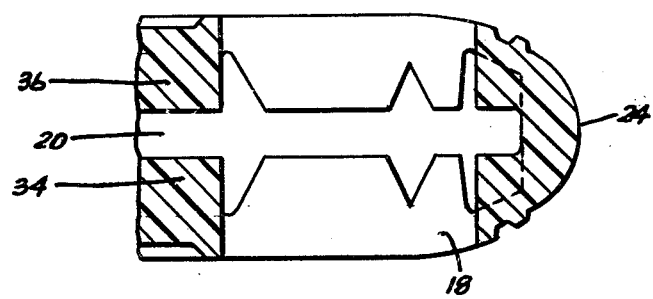
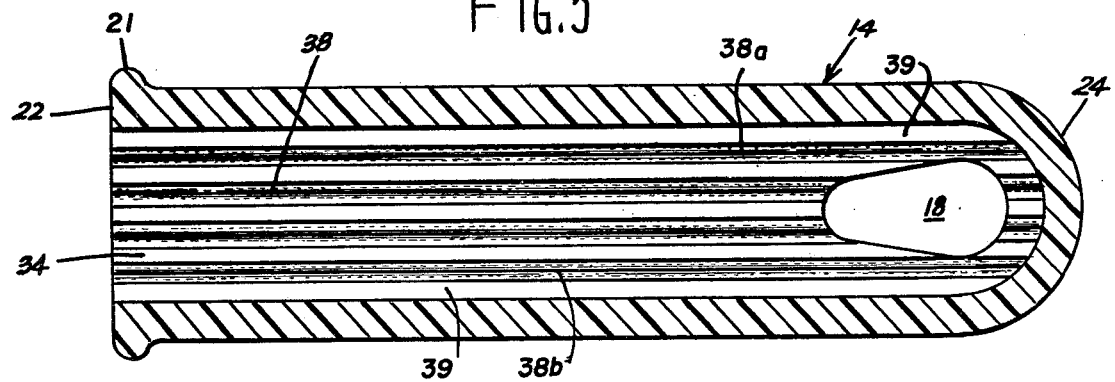

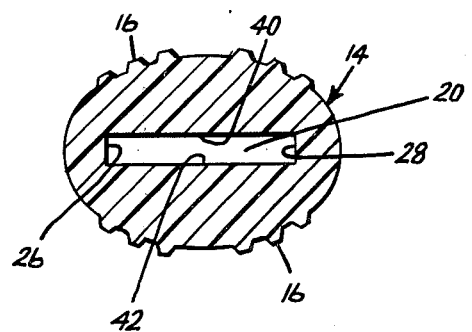
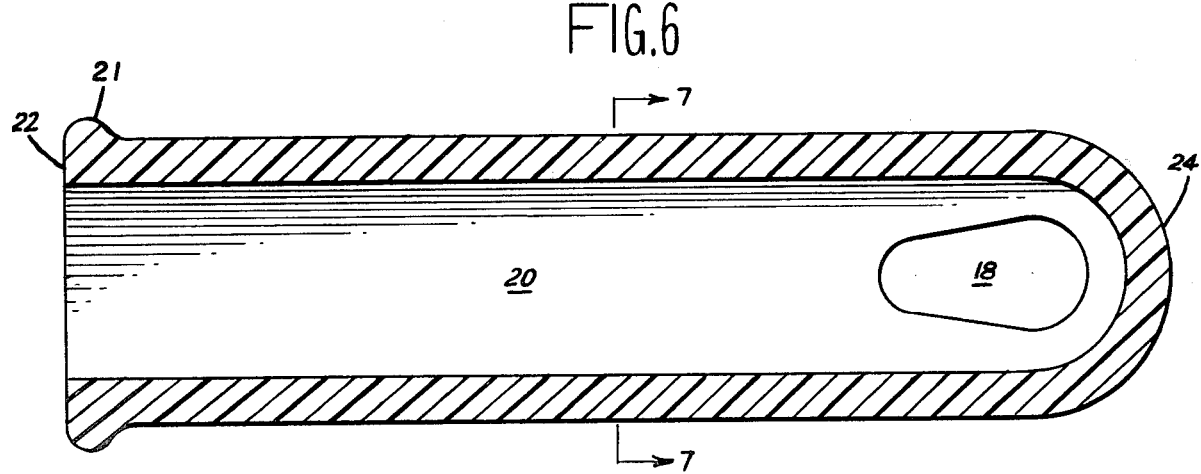

HAND GRIP FOR COOKING UTENSIL HANDLE

BACKGROUND OF THE INVENTION

The present invention relates to hand grips for cooking utensil handles, and in particular to a replaceable hand grip made of a resilient rubber-like material which can be slipped over the flat metal handles of commercial grade cookware. A persistent problem with cooking utensils is the provision of thermally insulating grips therefor. In domestic cookware, the pots and pans often have handles which include a molded plastic grip portion either molded or riveted to the handle part which, in turn, is welded or riveted to the vessel portion of the utensil. Because of the limited use of such a utensil in the home, this type of handle generally proves satisfactory, although prolonged heating of the utensil in some cases requires the use of a potholder when picking it up.

In the case of commercial cookware, however, the frequency and prolonged nature of the use, and washing, which often includes subjecting the utensil to sterilization, causes handles of molded plastic or wood to deteriorate rapidly and eventually fail long before the rest of the utensil has worn out. For this reason, most commercial cookware is provided with a simple metal handle which is either riveted or welded to the vessel portion. These handles are generally cast, forged or formed of sheet or strip metal stock and are, therefore, relatively thin. Many of the handles are generally flat in shape although some have a slightly V-shaped configuration to increase strength and rigidity.

As will be appreciated, pots and pans in commercial kitchens are used for prolonged periods of time and the metal handles become extremely hot. It is therefore necessary for the cook to wrap a potholder or dishtowel around the handle before picking it up, a practice which, at best, is inconvenient. Burns are often prevalent in such a situation because the cook will often lose track of the amount of time the utensil has been on the stove and therefore assume that the handle has not yet become hot enough to require the use of a potholder. Also, the cook may leave the potholder or dishtowel wrapped around the handle while the pan is on the stove, a situation which presents a serious fire hazard.

Representative prior art includes U.S. Pat. Nos. 2,235,792, 3,072,955 and 2,231,222.

SUMMARY OF THE INVENTION

To overcome the problems and disadvantages discussed above, the hand grip according to the present invention comprises a flexible rubber-like hand grip which may be slipped over the metal handles of commercial cookware. The grip is preferably made of silicon rubber, a material which can withstand the high contact temperature associated with harsh commercial use, this material as well exhibits low thermal conductivity and a sufficiently high coefficient of friction to cause the grip to be frictionally retained on the metal handle. Furthermore, the grip is sufficiently flexible to conform to the shape of the handle, whether it be substantially flat in cross-section or have a wide V-shaped configuration. Because the grip can be so easily attached to the handle simply by slipping it thereover, the grip is easily adaptable to a wide variety of sizes and shapes of handles and can be replaced in a matter of seconds. Furthermore, the ease with which the grip can be removed and installed enables a single grip to be interchangeably used for a number of utensils in a single kitchen.

In a preferred form of the invention, a plurality of axial ribs are provided internally of the grip, which serve to minimize the area of contact between the grip and the metal handle thereby reducing thermal conduction. Furthermore, this design enables air to flow between the grip and handle so as to provide additional cooling. One further advantage is that the reduction in material renders the grip lighter, which is advantageous in small skillets where there is a fairly critical balance between the handle and vessel portions.

Specifically, the present invention contemplates a hand grip for cooking utensil handles comprising an elongated body 40 of a resilient rubber-like material having low thermal conductivity, preferably silicone rubber, wherein the body has an elongated axial chamber therein extending from one end of the body to near the other end thereof but terminating short of the other end. The chamber is also elongated in transverse cross-section along a direction orthogonal to the longitudinal axis of the body, said chamber having transversely opposite ends, an upper wall and a lower wall. A series of successive grooves are formed in each of the upper wall and lower wall, wherein the grooves serve to provide some degree of thermal insulation between the hand grip and cooking utensil handle, when in use. Each of the series of grooves includes first and last grooves in the respective series wherein the first and last grooves are spaced from the transversely opposite ends, respectively, of the chamber so as to form lands between the first and last grooves of each of the series and the respective transversely opposite ends of the chamber. The chamber is of such a size to receive a standard cooking utensil handle.

It is an object of the present invention to provide a hand grip for cooking utensils which may be economically manufactured and universally adaptable to metal utensil handles of varying lengths and shapes.

It is a further object of the present invention to provide a resilient hand grip for utensil handles which has low thermal conductivity and suitable durometer and frictional characteristics to provide a cool gripping surface for the user even after prolonged heating of the utensil.

It is a further object of the present invention to provide a hand grip for a cooking utensil handle which is of lightweight construction to avoid tipping of the utensil when it is set down.

A still further object of the present invention is to provide a hand grip for a cooking utensil handle which is easily attached.

These and other objects and features of the invention will become apparent from the detailed description taken together with the accompanying drawings.

BRIEF DESCRIPTION OF THE DRAWINGS

FIG. 1 is a perspective view of a portion of a cooking utensil wherein the metal handle is provided with a hand grip according to the present invention;

FIG. 2 is a plan view of the grip;

FIG. 3 is a sectional view taken along line 3—3 of FIG. 2 and viewed in the direction of the arrows;

FIG. 4 is a sectional view taken along line 4—4 of FIG. 2 and viewed in the direction of the arrows;

FIG. 5 is a longitudinal sectional view of the grip shown in FIG. 2;

FIG. 6 is a longitudinal sectional view similar to FIG. 5 of a modified form of the invention; and FIG. 7 is a sectional view taken along line 7—7 of FIG. 6 and viewed in the direction of the arrows.

DETAILED DESCRIPTION

With specific reference to the drawings, there is shown in FIG. 1 a cooking vessel 10, such as a pan or skillet, having a metal handle 12 which is riveted thereto and is provided with a hand grip 14 according to the present invention. Although the cross-sectional shape of handle 12 is flat and generally rectangular, grip 14 is adaptable to many shapes of handles, such as those wherein the cross-sectional configuration is V-shaped.

Handle 14 is preferably made of silicone rubber, which is a blend of silicones with synthetic rubbers to render a rubber-like product having low thermal conductivity and good water and oil repellency. Such a rubber is characterized by good retention of flexibility, resilience and tensile strength over a wide range of temperatures, and has a sufficiently high coefficient of friction that it will frictionally adhere well to most surfaces and provide a good gripping surface for the user.

Grip 14 is generally elongated in shape having a width to thickness ratio of approximately 4:3. A plurality of external ribs 16 extending axially along the outer surface thereof serve to provide a better gripping surface for the user. Since the metal handles 12 are normally provided with an opening near the distal end thereof, grip 14 is provided with a complementary opening 18 in register with the handle opening. Transverse rib 21 serves to prevent the hand of the user from accidentally contacting the metal handle 12.

Grip 14 includes a central axial opening for chamber 20 (FIG. 3) which extends from the proximal end 22 thereof to very near the distal end 24 and is defined by surfaces 26 and 28 and by the uppermost edges 30 and lowermost edges 32 of lower and upper ribs 34 and 36, respectively. Ribs 34 and 36 extend parallel and in mutual facing arrangement such that respective ones of the ribs are positioned opposite each other. Thus, ribs 34 and 36 and side surfaces 26 and 28 define a generally rectangular unobstructed opening 20 which extends along nearly the entire length of grip 14.

Ribs 34 and 36 serve to minimize the area of contact between handle 12 and grip 14 so that thermal conduction is reduced as much as possible. A further advantage to this particular design is that series of grooves 38 defining air flow passageways are provided around handle 12 and the adjacent portions of grip 14 so as to provide additional cooling. In the case of many small skillets, there is a very critical balance between the vessel portion 10 and handle 12, and by eliminating as much of grip 14 as possible without reducing its insulating effect lightens grip 14 so that the vessel portion 10 remains the heavier of the two. If grip 14 becomes too heavy, the utensil will tip when it is set down.

The first and last grooves 38a and 38b in each series of grooves 38 are spaced inwardly from ends 26 and 28 of chamber 20 so as to form lands 39.

An alternate embodiment of the invention is shown in FIGS. 6 and 7 and in this case, no spacing ribs such as ribs 34 and 36 are provided and opening 20, which again is generally flat in configuration, is defined by side surfaces 26 and 28 and upper and lower surfaces 40 and 42.

By way of example, grip 14 may be approximately 4.5 in. in length, 1.3 in. in width and 0.8 in. thick. Opening 20 is 0.75 in. wide and 0.15 in. thick, and ribs 34 and 36 are spaced approximately 0.15 in. Of course, the above dimensions are not mandatory and are simply provided as an example. In order to accommodate a wide variety of utensil handles, a range of sizes of grips 14 would be provided, but the flexibility of the silicone rubber material makes each size of grip suitable for use with a fairly wide range of handle sizes because it is able to stretch so as to conform to the shape of the handle 12.

The following are examples of commercially available silicone rubbers suitable for hand grip 14:

SWS B157 (B150)
Durometer—50
Tensile strength—1225 ppi.
Elongation—600%
Tear—110 ppi.

G.E. SE435/50 parts 5 micron Minusil
Durometer—50
Tensile strength—1100 ppi.
Elongation—300%
Tear—75 ppi.

G.E. SE435/50 parts 5 micron Minusil/red iron oxide
Durometer—50
Tensile strength—1100 ppi.
Elongation—300%
Tear—75 ppi.

Dow Corning 50% NPC40 50%NPC80
Durometer—62
Tensile strength—950 ppi.
Elongation—300%
Tear—75 ppi.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A hand grip for cooking utensil handles comprising:
    an elongated body made of a resilient rubber-like material having low thermal conductivity,
    an elongated axial chamber in said body extending from one end of said body to near the other end thereof but terminating short of said other end,
    said chamber being elongated in transverse cross-section along a direction orthogonal to the longitudinal axis of said body, said chamber having transversely opposite ends and an upper wall and a lower wall,
    a series of successive axial grooves in said upper wall and a series of successive axial grooves in said lower wall, said grooves serving to provide some degree of thermal insulation between the hand grip and cooking utensil handle in use,
    each of said series of grooves including first and last grooves in the respective series, said first and last grooves being spaced from the transversely opposite ends, respectively, of said chamber so as to form lands between the first and last grooves of each of said series and the respective transversely opposite ends of said chamber, said chamber being of a size to receive a cooking utensil handle.

2. The hand grip of claim 1 wherein said body is made of silicon rubber.

3. The hand grip of claim 2 wherein said body has a durometer of approximately 40 to 60.

4. The hand grip of claim 1 including a hanger opening extending transversely through said body, said hanger opening being located near said other end of said body.

5. The hand grip of claim 1 wherein said opening has an aspect ratio greater than 4.0.

6. The hand grip of claim 5 wherein said aspect ratio is approximately 6.0.

7. The hand grip of claim 1 wherein said body is readily elastically deformable.

8. In combination with a cooking utensil handle, a hand grip comprising: an elongated body made of a resilient rubber-like material having low thermal conductivity, an elongated axial chamber in said body extending from one end of said body to near the other end thereof but terminating short of said other end, said chamber being elongated in transverse cross-section along a direction orthogonal to the longitudinal axis of said body, said chamber having transversely opposite ends and an upper wall and a lower wall, a series of successive grooves in said upper wall and a series of successive grooves in said lower wall, said grooves serving to provide some degree of thermal insulation between the hand grip and cooking utensil handle in use, each of said series including first and last grooves in the respective series, said first and last grooves being spaced from the transversely opposite ends, respectively, of said chamber so as to form lands between the first and last grooves in each of said series and the respective transversely opposite ends of said chamber, said handle being disposed in said chamber.

9. The combination of claim 8 wherein said handle includes a hanger opening near one end thereof and said hand grip includes an opening therethrough in register with said hanger opening.

10. The combination of claim 8 wherein said hand grip tightly frictionally engages said handle at points of mutual contact.

11. A hand grip for cooking utensil handles comprising:

an elongated body made of a resilient rubber-like material having low thermal conductivity, a durometer of between about 50 and about 60, and material stability at high cooking temperatures, an elongated axial chamber in said body extending from one end of said body to near the other end thereof but terminating short of said other end, said chamber being elongated in transverse cross-section along a direction orthogonal to the longitudinal axis of said body, said chamber having transversely opposite ends and an upper wall and a lower wall, a series of successive grooves in said upper wall and a series of successive grooves in said lower wall, said grooves serving to provide some degree of thermal insulation between the hand grip and cooking utensil handle in use, each of said series including first and last grooves in the respective series, said first and last grooves being spaced from the transversely opposite ends, respectively, of said chamber so as to form lands between the first and last grooves in each of said series and the respective transversely opposite ends of said chamber, said handle being disposed in said chamber.

* * * * *

UNITED STATES PATENT OFFICE
CERTIFICATE OF CORRECTION

Patent No. 4,197,611                                    Dated April 15, 1980

Inventor(s) Gordon D. Bell, Ronald E. Bratton, Robert J. Kennedy, Kendall S. Smith II and Roger A. Kaye It is certified that error appears in the above-identified patent and that said Letters Patent are hereby corrected as shown below:

Col. 2, line 15, "40" should be -- made --.

Claim 3, col. 5, line 8, "40 to 60" should be -- 50 to 60 --.

Signed and Sealed this

Twenty-ninth Day of July 1980

[SEAL]

Attest:

SIDNEY A. DIAMOND

Attesting Officer                Commissioner of Patents and Trademarks